(12) United States Patent
Yuhas

(10) Patent No.: US 9,901,911 B2
(45) Date of Patent: Feb. 27, 2018

(54) COHERENTLY GROWN COMPOSITE ALUMINOPHOSPHATE AND SILICOALUMINOPHOSPHATE MOLECULAR SIEVES

(71) Applicant: UOP LLC, Des Plaines, IL (US)

(72) Inventor: Benjamin D. Yuhas, Evanston, IL (US)

(73) Assignee: UOP LLC, Des Plaines, IL (US)

(*) Notice: Subject to any disclaimer, the term of this patent is extended or adjusted under 35 U.S.C. 154(b) by 491 days.

(21) Appl. No.: 14/574,655

(22) Filed: Dec. 18, 2014

(65) Prior Publication Data

US 2016/0175824 A1 Jun. 23, 2016

(51) Int. Cl.
| | |
|---|---|
| C01B 39/54 | (2006.01) |
| B01J 29/85 | (2006.01) |
| B01J 29/84 | (2006.01) |
| B01J 35/00 | (2006.01) |
| B01J 37/00 | (2006.01) |
| B01J 37/10 | (2006.01) |
| B01J 29/00 | (2006.01) |
| B01J 29/83 | (2006.01) |

(52) U.S. Cl.
CPC ............ *B01J 29/85* (2013.01); *B01J 29/005* (2013.01); *B01J 29/84* (2013.01); *B01J 35/0006* (2013.01); *B01J 37/0018* (2013.01); *B01J 37/10* (2013.01); *C01B 39/54* (2013.01); *B01J 29/83* (2013.01)

(58) Field of Classification Search
CPC .. C01B 39/54; B01J 29/83; B01J 29/84; B01J 29/85
See application file for complete search history.

(56) References Cited

U.S. PATENT DOCUMENTS

| | | | |
|---|---|---|---|
| 4,061,717 A | 12/1977 | Kerr et al. | |
| 4,310,440 A | 1/1982 | Wilson et al. | |
| 4,440,871 A | 4/1984 | Lok et al. | |
| 4,567,029 A | 1/1986 | Wilson et al. | |
| 4,973,781 A | 11/1990 | Valyocsik et al. | |
| 4,973,785 A | 11/1990 | Lok et al. | |
| 5,972,203 A | 10/1999 | Smith et al. | |
| 7,449,169 B2 | 11/2008 | Corma Canos et al. | |
| 7,648,694 B2 | 1/2010 | Burton, Jr. | |
| 7,820,141 B2 | 10/2010 | Burton, Jr. | |

(Continued)

FOREIGN PATENT DOCUMENTS

| | | |
|---|---|---|
| WO | WO 2010/059297 A2 | 5/2010 |
| WO | WO 2010/065319 A2 | 6/2010 |

(Continued)

OTHER PUBLICATIONS

Sasidharan et al., "Designing the synthesis of catalytically active Ti—B using various new templates . . . ," Physical Chemistry Chemical Physics (2011), 13(36), 16282-16294.

Maple et al., "Synthesis and characterization of aluminophosphate-based zeotype materials . . . " Dalton Transactions (2007), vol. 37, 4175-4181.

(Continued)

*Primary Examiner* — David M Brunsman

(57) ABSTRACT

Coherently grown composites of two zeotypes are described. The coherently grown composites have a crystalline three-dimensional framework of at least $AlO_2$ and $PO_2$ tetrahedral units. The two zeotypes are selected from the group consisting of AFX, LEV, CHA, and ERI. Methods of making the coherently grown composites are also described.

16 Claims, 10 Drawing Sheets

(56) References Cited

U.S. PATENT DOCUMENTS

| | | | |
|---|---|---|---|
| 7,906,099 B2* | 3/2011 | Cao | B01J 29/005 423/305 |
| 8,075,871 B2 | 12/2011 | Burton, Jr. et al. | |
| 8,163,259 B2 | 4/2012 | Cao et al. | |
| 8,809,217 B2* | 8/2014 | Andersen | B01D 53/9418 502/214 |
| 8,846,998 B2 | 9/2014 | Nicholas et al. | |
| 8,871,178 B2 | 10/2014 | Lewis et al. | |
| 8,906,225 B2 | 10/2014 | Lewis et al. | |
| 8,932,973 B2* | 1/2015 | Andersen | B01D 53/9418 502/214 |

FOREIGN PATENT DOCUMENTS

| | | |
|---|---|---|
| WO | WO 2010/099441 A2 | 9/2010 |
| WO | WO 2013/019462 A1 | 2/2013 |
| WO | WO 2013/028303 A1 | 2/2013 |

OTHER PUBLICATIONS

Corma et al., "A zeolite with interconnected 8-, 10- and 12-ring pores and its unique catalytic selectivity," Nature Materials (2003), 2(7), 493-497.

Thomas, J., "Quaternary Ammonium Compounds . . . " Journal of Medicinal and Pharmaceutical Chemistry (1961), 3(1), 45-51.

Aitken et al., "A synthetic and NMR conformational study of spiro cyclic quaternary ammonium salts," Arkivoc (2002), vol. iii, 63-70.

Libman et al., "Some Bisquaternary Salts," Journal of the Chemical Society (1952), 2305-2307.

Zhang et al., "Synthesis of Self-Pillared Zeolite Nanosheets by Repetitive Branching," Science (2012), vol. 336, 1684-1687.

Schreyeck et al., "The diaza-polyoxa-macrocycle 'Kryptofix222' as a new template . . . " Microporous and Mesoporous Materials (1998), 22, 87-106.

Broach et al., "New ABC-6 net molecular sieves ZnAPO-57 and ZnAPO-59 . . . ", Microporous and Mesoporous Materials (2013), vol. 189, 49-63.

* cited by examiner

COHERENTLY GROWN COMPOSITE ALUMINOPHOSPHATE AND SILICOALUMINOPHOSPHATE MOLECULAR SIEVES

BACKGROUND OF THE INVENTION

1. Field of the Invention

This invention relates to novel coherently grown composites of two zeotypes. The coherently grown composites comprise two distinct crystal phases that are coherently and rationally joined together in a single material.

2. Description of the Related Art

Classes of molecular sieves include crystalline aluminophosphate, silicoaluminophosphate, or metalloaluminophosphate compositions which are microporous and which are formed from corner sharing $AlO_{4/2}$ and $PO_{4/2}$ tetrahedra. In 1982, Wilson et al. first reported aluminophosphate molecular sieves, the so-called AlPOs, which are microporous materials that have many of the same properties as zeolites, although they are silica free (See U.S. Pat. No. 4,310,440). Subsequently, charge was introduced to the neutral aluminophosphate frameworks via the substitution of $SiO_{4/2}$ tetrahedra for $PO_{4/2}^+$ tetrahedra to produce the silicoaluminophosphate (SAPO) molecular sieves as described by Lok, et. al. (See U.S. Pat. No. 4,440,871). Another way to introduce framework charge to neutral aluminophosphates is to substitute $[Me^{2+}O_{4/2}]^{2-}$ tetrahedra for $AlO_{4/2}^-$ tetrahedra, which yield the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785).

Numerous molecular sieves, both naturally occurring and synthetically prepared, are used in various industrial processes. Synthetically, these molecular sieves are prepared via hydrothermal synthesis employing suitable sources of Si, Al, P, and structure directing agents such as amines or organoammonium cations. The structure directing agents reside in the pores of the molecular sieve and are largely responsible for the particular structure that is ultimately formed. These species may balance the framework charge associated with silicon or other metals such as Zn in the aluminophosphate compositions and can also serve as space fillers to stabilize the tetrahedral network framework. Molecular sieves are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent molecular sieve crystal structure. Molecular sieves can be used as catalysts for hydrocarbon conversion reactions, which can take place on outside surfaces as well as on internal surfaces within the pore.

Synthesis of molecular sieve materials often relies on the use of organoamino or organoammonium templates known as organic structure directing agents (OSDAs). While simple OSDAs such as tetramethylammonium, tetraethylammonium and tetrapropylammonium are commercially available, often, OSDAs are complicated molecules that are difficult and expensive to synthesize; however, their importance lies in their ability to impart aspects of their structural features to the molecular sieve to yield a desirable pore structure. For example, the use of 1,4,7,10,13,16-hexamethyl-1,4,7,10,13,16-hexaazacyclooctadecane as OSDA has been shown to allow synthesis of STA-7, an aluminophosphate based material of the SAV zeotype (Wright, et. al. *J. Chem. Soc., Dalton Trans.*, 2000, 1243-1248); the use of 4,7,13,16,21,24-hexaoxa-1,10-diazabicyclo[8.8.8]hexacosane ('Kryptofix 222') led to the synthesis of $AlPO_4$-42 (Schreyeck, et. al. *Micro. Meso. Mater.* 1998, 22, 87-106); MAPO-35, a magnesium aluminophosphate material with the LEV topology, is disclosed in U.S. Pat. No. 4,567,029 in which quinuclidine is employed as a structure directing agent; and in U.S. Pat. No. 4,973,785, the MeAPSO composition CoAPSO-35 is disclosed, which contains both cobalt and silicon in the framework in addition to Al and P and uses methylquinuclidine as the structure directing agent.

The art clearly shows that use of complex organoammonium SDAs often results in new molecular sieve materials. However, the synthesis of these complicated organoammonium compounds is quite lengthy and requires many steps, often in an organic solvent, thereby hindering development of the new molecular sieve material. Frequently, even for simple, commercially available OSDAs, the OSDA is the most costly ingredient used in synthesizing molecular sieve materials. Consequently, it would be economically advantageous to synthesize new molecular sieves from either commercially available organoammonium SDAs or SDAs which may be readily synthesized from commercially available starting materials.

The simple, commercially available, amine morpholine (tetrahydro-1,4-oxazine) has been previously utilized in aluminophosphate based molecular sieve synthesis and has been shown to yield CHA-type molecular sieves (Marchese, et. al. *Micro. Meso. Mater.* 1999, 30, 145-53; Ito, et. al. *Acta Cryst.* 1985, C41, 1698-1700), but has not yet been shown to yield other structure type molecular sieves. Additionally, the vapor pressure of morpholine is relatively high, making its use on commercial scale troublesome as low vapor pressure organoammonium SDAs are preferred.

The complicated OSDA(s) discussed previously were synthesized ex-situ and added to the reaction mixture at several points. However, one drawback of ex-situ synthesis is the process is typically carried out in the presence of an organic solvent, which necessitates at least one undesirable purification step to recover the SDA from the unwanted organic material.

The properties of molecular sieves are highly dependent on their crystal structure, as this can dictate how fast molecules can move through the pores, what molecules can be excluded from the pores, the number and strength of the acid sites, etc. Depending on the type of application, a single molecular sieve may not possess all of the properties desired for the application.

Composite materials containing two or more crystal structures, can be valuable materials because they allow for two distinct regions of activity or adsorptivity in a single unified structure. However, composite materials are quite rare in the literature.

U.S. Pat. No. 5,972,203 describes a catalyst comprising first alumino-phospho-molecular sieves and a binder comprising second alumino-phospho-molecular sieves. There is no evidence that the catalysts are intergrown, and the description is suggestive of two distinct phases with no coherency between them.

Zheng et al., "Synthesis of Self-Pillared Zeolite Nanosheets by Repetitve Branching," Science, 336, 1684 (2012) describes zeolites having a MFI phase with MEL intergrowths. The MEL intergrowths introduce a different symmetry in the direction normal to the nanosheet, allowing growth (pillaring) in that direction. It relies on rotational intergrowth to produce the pillared nanosheets.

U.S. Pat. No. 8,809,217 ('217 patent) describes a catalyst for the selective reduction of $NO_x$. The support for the catalyst is a molecular sieve having at least one intergrown phase having at least two different small-pore, three dimensional framework structures. The molecular sieves with intergrown phases are disordered as evidenced by the significant peak broadening in their x-ray diffraction patterns.

U.S. Pat. No. 8,163,259 ('259 patent) describes a molecular sieve comprising at least one intergrown phase of an AFX framework-type molecular sieve and a CHA framework-type molecular sieve. According to the '259 patent, intergrown molecular sieves are disordered planar intergrowths of molecular sieve frameworks. Structurally disordered structures show periodic ordering in zero, one, or two dimensions, rather than in three dimensions as with regular crystalline solids.

Disordered molecular sieves show weakened or broadened peaks in x-ray diffraction. For example, the peaks for the AFX/CHA material in the '259 patent are very weak and broad. This is also true of the '217 patent.

Even rarer are those materials termed coherently grown composites.

U.S. Pat. No. 8,846,998 describes a family of coherently grown composites of TUN and IMF zeolites. The structure was confirmed by x-ray diffraction, scanning electron microscopy, and transmission electron microscopy. In coherently grown composite structures, both structures are present in a major portion of the crystals in a given sample. This coherently grown composite structure is possible when the two zeotypic structures have nearly identical spacial arrangements of atoms along at least a planar projection of their crystal structure and possess similar pore topologies.

However, there are no known coherently grown composites of aluminophosphate and silicoaluminophosphate molecular sieves.

SUMMARY OF THE INVENTION

One aspect the invention is a coherently grown composite of two zeotypes having a crystalline three-dimensional framework of at least $AlO_2$ and $PO_2$ tetrahedral units, the two zeotypes selected from the group consisting of AFX, LEV, CHA, and ERI.

In one version, the coherently grown composite of claim 1 has an empirical formula expressed in molar ratios of:

where R represents at least one organic template present inside the pores of the molecular sieve; m is the molar ratio of R to $(Si_xAl_yP_zO_2)$ and has a value of about 0 to 0.5; x is the mole fraction of silicon and has a value from about 0 to 0.6; y is the mole fraction of aluminum and has a value from about 0.01 to 0.6; z is the mole fraction of phosphorus and has a value from about 0.01 to 0.55; and x+y+z=1.

Another aspect of the invention is a method for synthesizing a coherently grown composite of two zeotypes having a crystalline three-dimensional framework of at least $AlO_2$ and $PO_2$ tetrahedral units, the two zeotypes selected from the group consisting of AFX, LEV, CHA, and ERI. The method may include (a) preparing an aqueous mixture comprising water, a substituted hydrocarbon, and a 1-oxa-4-azacyclohexane derivative; (b) reacting the aqueous mixture; (c) obtaining a solution comprising an organo-1-oxa-4-azoniumcyclohexane compound, wherein the organo-1-oxa-4-azoniumcyclohexane compound has the structure of Formula 1:

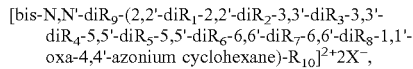

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m; (d) forming a reaction mixture comprising reactive sources of Al, and P, and the solution; and (e) heating the reaction mixture to form the molecular sieve.

These and other features, aspects, and advantages of the present invention will become better understood upon consideration of the following detailed description, drawings and appended claims.

DETAILED DESCRIPTION OF THE INVENTION

It was discovered that coherently grown composite aluminophosphate (AlPO) and silicoaluminophosphate (SAPO) molecular sieves having two crystal phases could be made using the process described below. The coherently grown composite of two zeotypes has a crystalline three-dimensional framework of at least $AlO_2$ and $PO_2$ tetrahedral units. In some versions, the coherently grown composite of two zeotypes has a crystalline three-dimensional framework of $SiO_2$, $AlO_2$ and $PO_2$ tetrahedral units. The two crystalline phases are selected from AFX, LEV, CHA, and ERI.

The coherently grown composite AlPO and SAPO molecular sieves have several advantages. The two crystalline phases are in intimate contact without the use of a binder. The cage structures of the two crystal phases can be joined at the interface seamlessly. In some embodiments, the two crystalline phases can have different concentrations of silicon, leading to distinctly different acid site densities and/or strength regimes in the same material.

Figure 5A:
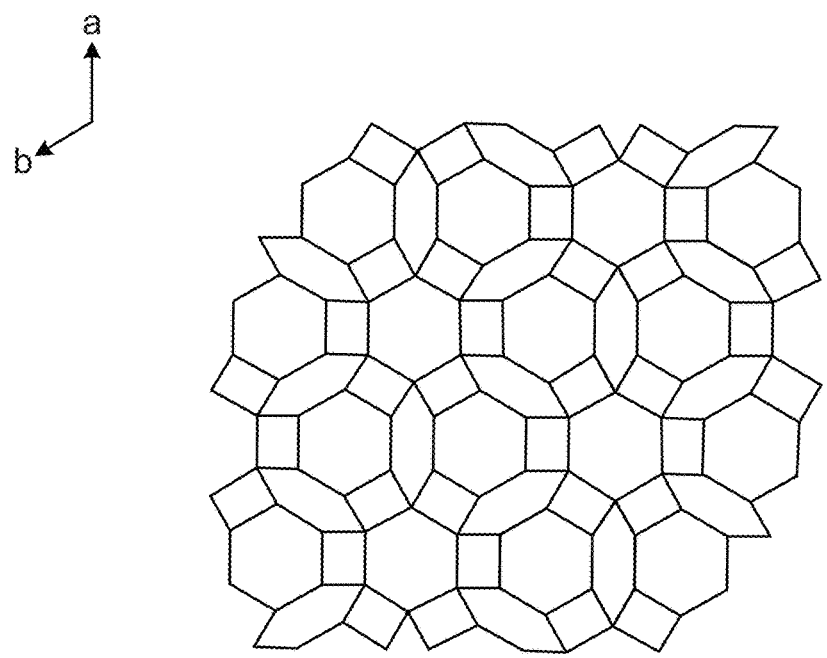
FIGS. 5A-C are wireframe representations of the AFX (5A), LEV (5B), and CHA (5C) phases looking down the basal plane of the hexagonal cell.
Figure 5B:
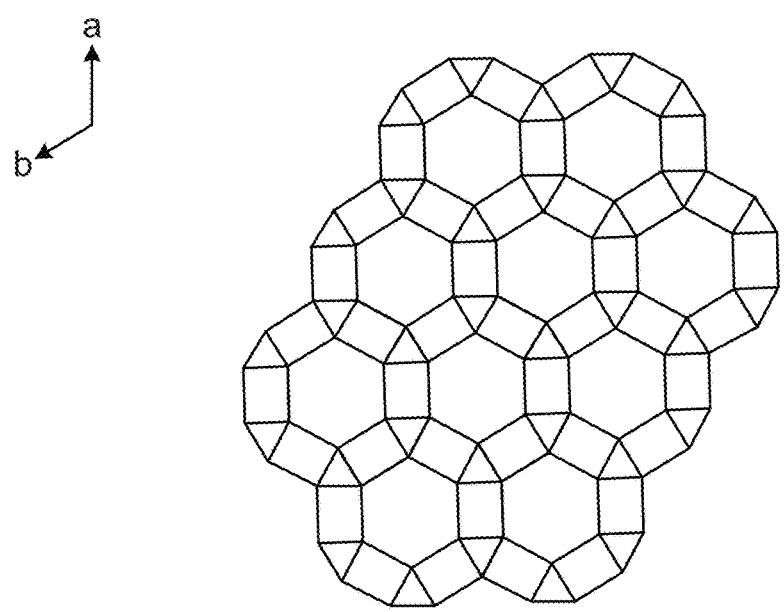
Figure 5C:
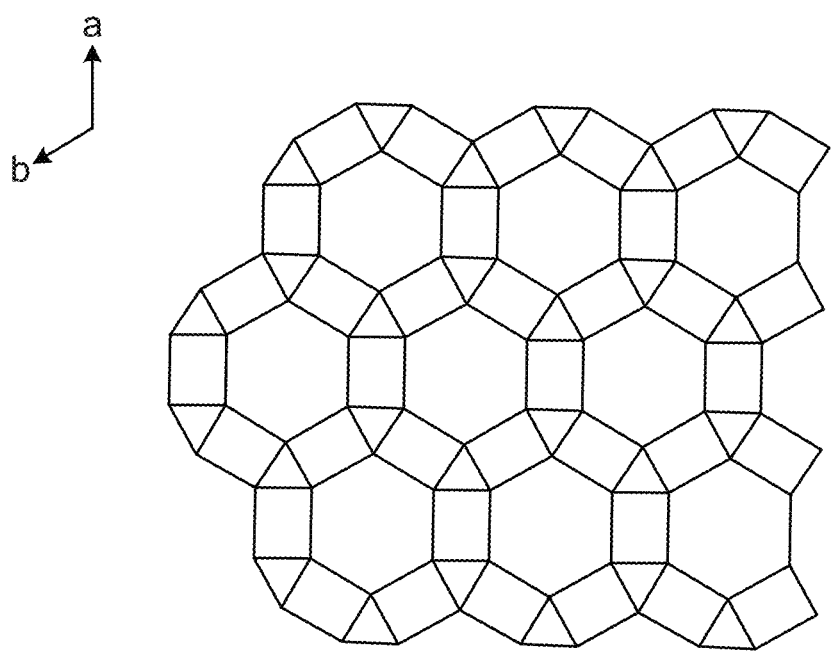

For example, FIG. 5A shows a wireframe representation of the AFX framework in the down the basal plane of the hexagonal cell. FIG. 5B shows the LEV framework, and FIG. 5C shows the CHA framework down the same plane. On each vertex sits a tetrahedral atom (or T-atom) and in the middle of each stick is a corner-shared oxygen atom. A change in the stacking pattern can lead to growth of one zeotype off of another.

As the AFX, LEV, CHA, and ERI zeotypes are 3-dimensional structures that can be built up through particular stacking patterns of 6-rings and have nearly identical projections in one plane, the two structures can thereby coherently grow off crystals of the other structure with interfaces at the compatible planes to form a coherently grown composite structure.

A coherently grown composite structure is not merely a physical mixture of the two molecular sieves. Electron diffraction, transmission electron microscopy (TEM), scanning electron microscopy (SEM) and x-ray diffraction analysis are employed to show that a material is a coherently grown composite structure instead of a physical mixture. Usually the combination of electron diffraction and electron microscopy is most definitive in determining whether a coherently grown composite structure has been produced because it provides direct evidence of the existence of both crystal phases that are joined together into a single common superstructure. The close, intimate contact of the two crystal phases can be visualized with electron microscopy, while the crystallographic orientation of the two phases at their interface can be determined by electron diffraction.

Since the coherently grown composite structure zeolites of this invention can have varying amounts of the two structure types, it is to be understood that the relative intensity and line width of some of the diffraction lines will vary depending on the amount of each structure present in the coherently grown composite structure. Although the degree of variation in the x-ray powder diffraction patterns is theoretically predictable for specific structures, the more likely mode of a coherently grown composite structure is random in nature and therefore difficult to predict without the use of large hypothetical models as bases for calculation.

In some versions, the coherently grown composite has an empirical formula expressed in molar ratios of:

mR:(Si$_x$Al$_y$P$_z$O$_2$)

where R represents at least one organic template present inside the pores of the molecular sieve; m is the molar ratio of R to (Si$_x$Al$_y$P$_z$O$_2$) and has a value of about 0 to 0.5; x is the mole fraction of silicon and has a value from about 0 to 0.6; y is the mole fraction of aluminum and has a value from about 0.01 to 0.6; z is the mole fraction of phosphorus and has a value from about 0.01 to 0.55; and x+y+z=1.

In some versions, the coherently grown composite comprises regions of the first zeotype and regions of the second zeotype that are coherently aligned so that an [010] zone axis of the first zeotype is parallel to an [010] zone axis of the second zeotype.

The as-synthesized coherently grown composite is characterized by the x-ray diffraction pattern, having at least the d-spacings and relative intensities set forth in Tables 1-3 below. Diffraction patterns herein were obtained using a typical laboratory powder diffractometer, utilizing the K$_\alpha$ line of copper; Cu K alpha. From the position of the diffraction peaks represented by the angle 2theta, the characteristic interplanar distances d$_{hkl}$ of the sample can be calculated using the Bragg equation. The intensity is calculated on the basis of a relative intensity scale attributing a value of 100 to the line representing the strongest peak on the X-ray diffraction pattern, and then: weak (w) means 5-20% of I$_0$; medium (m) means 20-50% of I$_0$; strong (s) means 50-80% of I$_0$; very strong (vs) means 80-100% of I$_0$. Intensities may also be shown as inclusive ranges of the above. The X-ray diffraction patterns from which the data (d spacing and intensity) are obtained are characterized by a large number of reflections some of which are broad peaks or peaks which form shoulders on peaks of higher intensity. Some or all of the shoulders may not be resolved. This may be the case for samples of low crystallinity, of particular coherently grown composite structures or for samples with crystals which are small enough to cause significant broadening of the X-rays. This can also be the case when the equipment or operating conditions used to produce the diffraction pattern differ significantly from those used in the present case.

Figure 9:
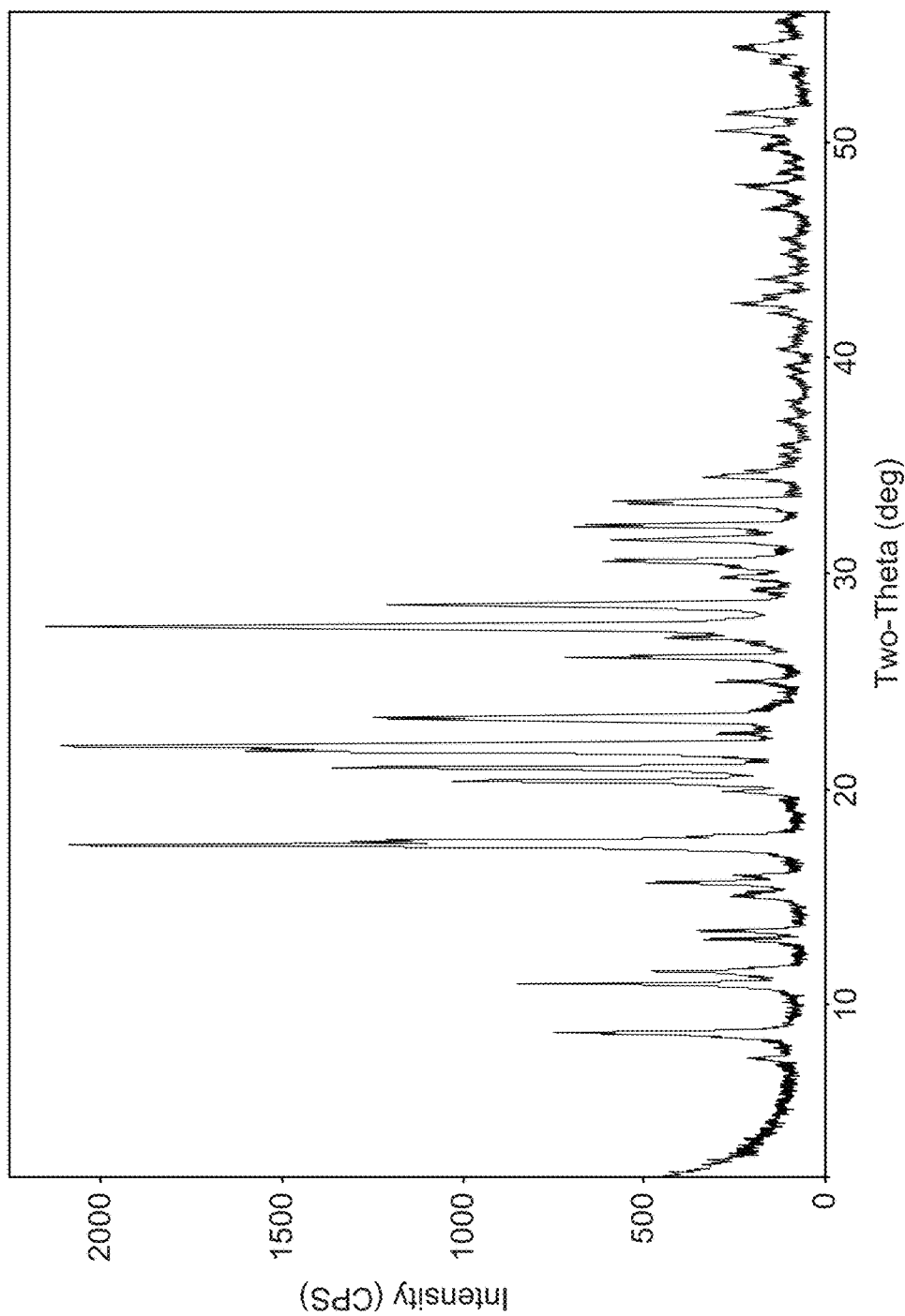
FIG. 9 shows the x-ray diffraction pattern of the Example 8 product.
Figure 10:
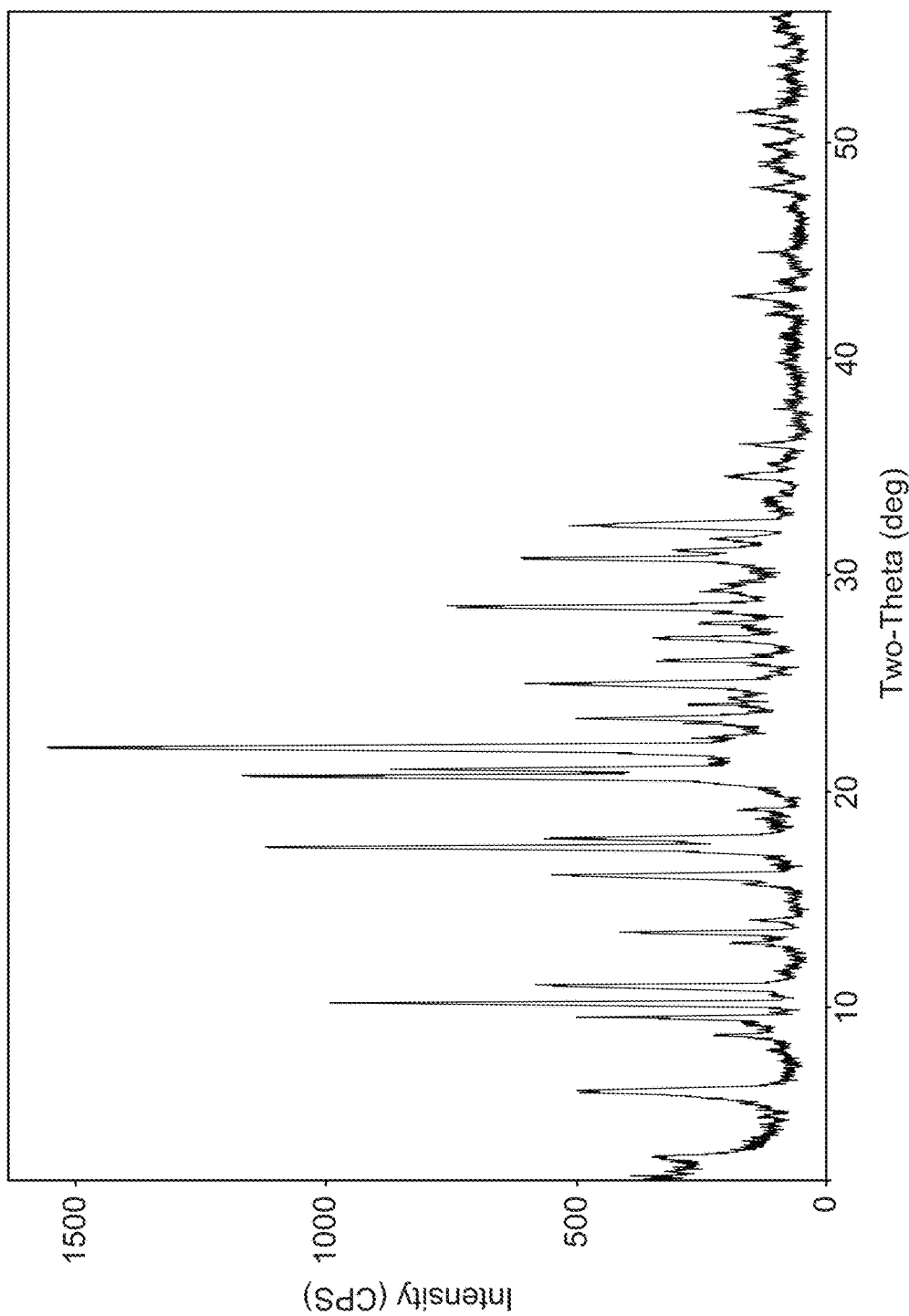
FIG. 10 shows the x-ray diffraction pattern of the Example 9 product.
Figure 11:
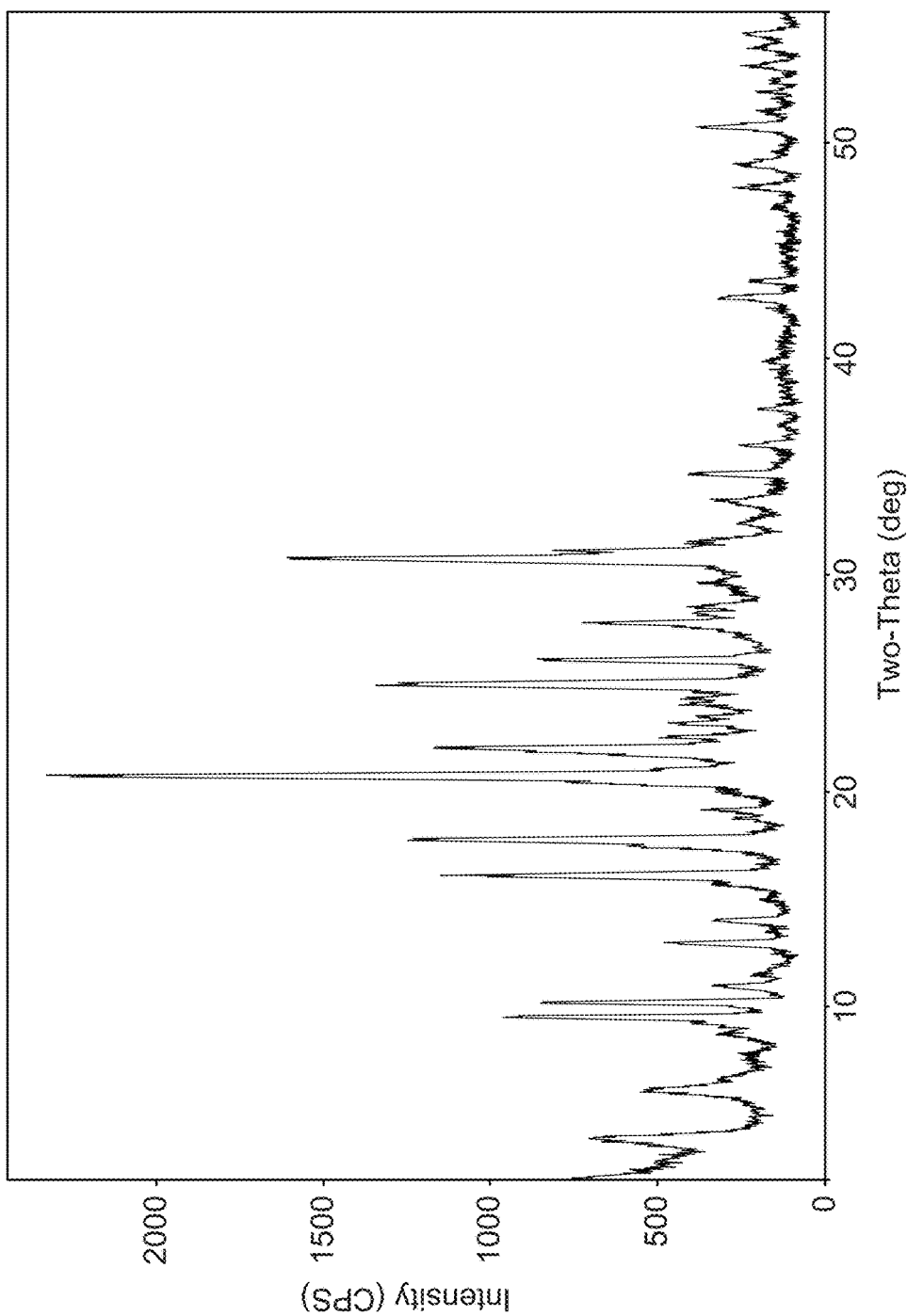
FIG. 11 shows the x-ray diffraction pattern of the Example 10 product.

The X-ray diffraction pattern for the coherently grown composites contains many peaks. Examples of the x-ray diffraction patterns for various as-synthesized products are shown in FIGS. 9-11. Additional peaks, particularly those of very weak intensity (less than 5% of I$_0$), may also be present.

In some versions, the coherently grown composite contains AFX and LEV phases. In some versions, the coherently grown composite containing AFX and LEV phases is characterized by an x-ray diffraction pattern having at least the d-spacings and intensities set forth in Table 1:

TABLE 1

| 2-Theta | d(Å) | I/I$_0$ (%) |
|---|---|---|
| 7.51 | 11.77 | w |
| 8.70 | 10.16 | m |
| 10.98 | 8.05 | m-s |
| 11.55 | 7.66 | m |
| 13.01 | 6.80 | w-m |
| 13.42 | 6.59 | w-m |
| 15.65 | 5.66 | m |
| 15.97 | 5.55 | w |
| 17.40 | 5.09 | vs |
| 17.57 | 5.04 | s-vs |
| 20.37 | 4.36 | s |
| 20.99 | 4.23 | s-vs |
| 21.94 | 4.05 | vs |
| 23.30 | 3.81 | s |
| 24.98 | 3.56 | w |
| 26.11 | 3.41 | m |
| 27.00 | 3.30 | w-m |
| 27.54 | 3.24 | vs |
| 28.50 | 3.13 | s |
| 30.56 | 2.92 | m |
| 31.55 | 2.83 | m |
| 32.22 | 2.78 | m-s |
| 33.31 | 2.69 | m |
| 34.47 | 2.60 | w |

In some versions, the coherently grown composite contains CHA and LEV phases. In some versions, the coherently grown composite containing CHA and LEV phases is characterized by an x-ray diffraction pattern having at least the d-spacings and intensities set forth in Table 2:

TABLE 2

| 2-Theta | d(Å) | I/I$_0$ (%) |
|---|---|---|
| 6.10-6.24 | 14.49-14.15 | s-m |
| 8.65 | 10.21 | w-m |

TABLE 2-continued

| 2-Theta | d(Å) | I/I₀ (%) |
|---|---|---|
| 9.49 | 9.31 | m |
| 10.94 | 8.08 | m-s |
| 12.94 | 6.84 | w-m |
| 13.40 | 6.60 | m |
| 13.96 | 6.34 | w |
| 16.04 | 5.52 | m |
| 17.35 | 5.11 | s-vs |
| 17.74 | 5.00 | m-s |
| 20.37 | 4.36 | w-m |
| 20.66 | 4.30 | s |
| 20.92 | 4.24 | s |
| 21.98 | 4.04 | vs |
| 23.33 | 3.81 | m-s |
| 24.93 | 3.57 | m-s |
| 26.02 | 3.42 | m |
| 27.01 | 3.30 | m |
| 28.45 | 3.13 | s |
| 29.21 | 3.05 | w |
| 30.70 | 2.91 | m |
| 31.08 | 2.88 | w-m |
| 31.56 | 2.83 | w-m |
| 32.28 | 2.77 | m-s |
| 34.46 | 2.60 | m |

In some versions, the coherently grown composite contains CHA and AFX phases. In some versions, the coherently grown composite containing CHA and AFX phases is characterized by an x-ray diffraction pattern having at least the d-spacings and intensities set forth in Table 3:

TABLE 3

| 2-Theta | d(Å) | I/I₀ (%) |
|---|---|---|
| 6.08-6.30 | 14.53-14.02 | m-s |
| 8.75 | 10.10 | w |
| 9.50 | 9.30 | m |
| 12.94 | 6.84 | w-m |
| 13.96-14.05 | 6.34-6.30 | w-m |
| 15.66 | 5.65 | w |
| 16.06-16.12 | 5.52-5.50 | s |
| 17.40-17.47 | 5.09-5.07 | m |
| 17.69-17.79 | 5.01-4.98 | s |
| 18.71 | 4.74 | w |
| 19.08 | 4.65 | w-m |
| 19.78 | 4.48 | w |
| 20.67 | 4.29 | vs |
| 21.81-22.04 | 4.07-4.03 | s |
| 22.51 | 3.95 | w |
| 23.14-23.22 | 3.84-3.83 | w |
| 23.37 | 3.80 | w |
| 24.89-25.00 | 3.58-3.56 | s |
| 26.05 | 3.42 | m-s |
| 27.74 | 3.21 | m |
| 30.73 | 2.91 | s-vs |
| 31.06-31.16 | 2.88-2.87 | m-s |
| 34.65 | 2.59 | w-m |

It is noteworthy that the x-ray diffraction pattern for the coherently grown composite containing CHA and AFX phases includes peaks between 3 and 7 degrees 2-theta. In contrast, the intergrown CHA/AFX material of the '259 patent does not show any peaks in this region.

In some versions, the coherently grown composite contains CHA and ERI phases. In some versions, the coherently grown composite contains LEV and ERI phases. In some versions, the coherently grown composite contains AFX and ERI phases.

In some versions, coherently grown composite comprises greater than 0 and less than 100 wt. % the first zeotype and less than 100 wt. % and greater than 0 wt. % of the second zeotype. In some versions, the coherently grown composite comprises greater than 5 and less than 95 wt. % the first zeotype and less than 95 wt. % and greater than 5 wt. % of the second zeotype. In some versions, the coherently grown composite comprises greater than 10 and less than 90 wt. % the first zeotype and less than 90 wt. % and greater than 10 wt. % of the second zeotype.

In some versions, the coherently grown composite is thermally stable to a temperature of at least about 600° C., or to at least 650° C., or to at least 700° C.

In some versions, the coherently grown composite has a micropore volume of at least 0.1 cc/g, or at least 0.15 cc/g, or at least 0.2 cc/g. The micropore volume of a particular porous material may be determined, for example, by nitrogen adsorption using the conventional BET method of analysis (see, e.g., J. Am. Chem. Soc. 1938, 60, 309-16) as implemented in Micrometrics ASAP 2010 software (from Micrometrics Instrument Corporation).

A process for preparing a pre-reacted aqueous solution of substituted hydrocarbons and amines essentially incapable of undergoing pyramidal inversion which overcome the aforementioned difficulties was developed previously. The surprising discovery was made that a substituted hydrocarbon and an amine may be reacted in an aqueous solution at (or slightly above) room temperature to yield an aqueous solution comprising the OSDA. This process is disclosed for a broad class of amines in U.S. application Ser. No. 14/552,654, hereinby incorporated by reference. This solution may then be used without purification in the synthesis of molecular sieves. This procedure thereby allows the preparation of SDAs, such as unusual quaternary ammonium salts, from readily available starting reagents in a facile and practical manner.

The process can be used to make novel 1-oxa-4-azonium cyclohexane salts from 1-oxa-4-azacyclohexane derivatives, as described in U.S. application Ser. No. 14/561,132, hereinby incorporated by reference.

OSDAs prepared by the methods of the process of U.S. application Ser. Nos. 14/552,654, and 14/561,132, are in aqueous solution and do not pose odor and flashpoint concerns. The result is the unprecedented ability to remove the cooling step typically required in the preparation of in-situ zeolite reaction mixtures and to avoid purification steps such as evaporation of organic solvent typically required in ex-situ preparation methods.

The novel 1-oxa-4-azonium cyclohexane salts of U.S. application Ser. No. 14/561,132 can be used as an organic structure directing agent (OSDA), and they overcome many of the typical problems associated with OSDA synthesis and subsequent molecular sieve synthesis. U.S. application Ser. No. 14/561,132 covers methods for synthesis of the 1-oxa-4-azonium cyclohexane salts from a variety of starting materials.

Figure 1:
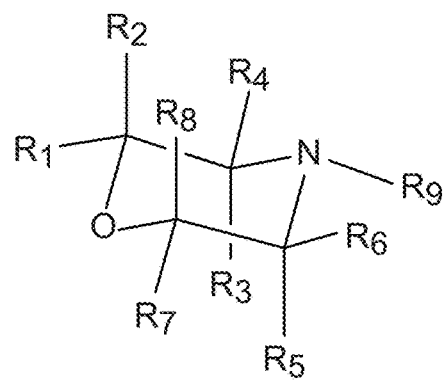
FIG. 1 is an illustration of the 1-oxa-4-azacyclohexane derivative.
Figure 2:
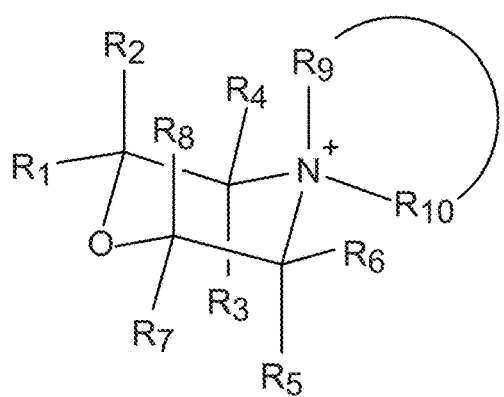
FIG. 2 is an illustration of the class of 1-oxa-4-azonium cyclohexane salts having the structure of Formula 3.
Figure 3:
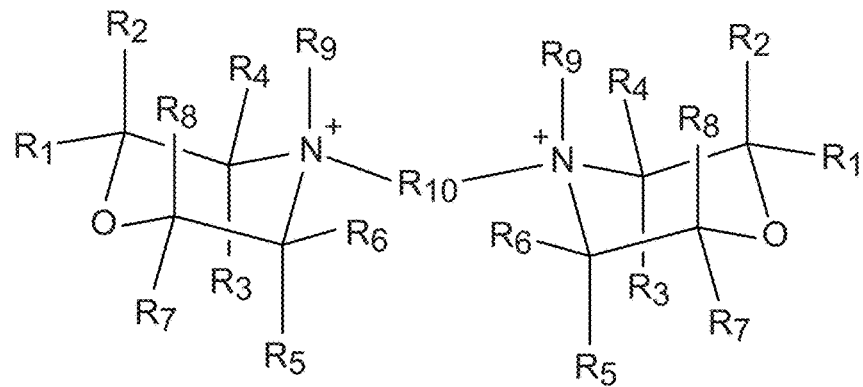
FIG. 3 is an illustration of the class of 1-oxa-4-azonium cyclohexane salts having the structure of Formula 1.

In a typical method for preparing the 1-oxa-4-azonium cyclohexane salts described in U.S. application Ser. No. 14/561,132, a substituted hydrocarbon is added to water to form a mixture. The 1-oxa-4-azacyclohexane derivative, as shown in FIG. 1, may then be added and the reaction mixture stirred until a solution containing the 1-oxa-4-azonium cyclohexane salt is observed. If the solution is cooled to room temperature, the product is stably maintained as an aqueous solution for later use.

In certain embodiments, the precursor reagents (e.g., the substituted alkane and 1-oxa-4-azacyclohexane derivative) may be added separately or together to form the reaction mixture at a number of points in the process. The precursors may be reacted together at temperatures ranging from about 0° C. to about 125° C. Preferably, the precursors are reacted at about room temperature or at a slightly elevated temperature such as temperatures ranging from about 5° C. to about 100° C. More preferably, the precursors are reacted at temperatures from about 20° C. to about 120° C., or about 20° C. to about 80° C.

The reaction time varies from about 5 minutes to about 72 hr or from about 15 minutes to about 48 hr or from about 0.5 hr to about 48 hr.

The resulting solution may be cooled to room temperature or used as is. Other known techniques require the use of purification steps such as distillation, crystallization, chromatography and removal of a component via vacuum. A benefit of the method of U.S. application Ser. No. 14/561,132 is that the solution of the organo-1-oxa-4-azoniumcyclohexane salt is prepared without additional purification steps occurring prior to use of the solution to make zeolites and molecular sieves. Some small laboratory scale procedures may involve removal of unreacted reactants; however, in commercial embodiments, it is most likely to react to completion. Ion-exchange as described below does not purify the solution, but converts halide anions to hydroxide ions and thus is not a purification step. The resulting solution may be cooled to room temperature or used as is. However, no purification steps occur prior to use of the solution.

The 1-oxa-4-azonium cyclohexane salts of U.S. application Ser. No. 14/561,132 can be used to make aluminophosphate and silicoaluminophosphate molecular sieves as described in U.S. application Ser. No. 14/561,121, hereinby incorporated by reference. The methods may be carried out in preparation of microporous crystalline molecular sieves. In one aspect, the method for synthesizing a molecular sieve may include the steps of: (a) preparing an aqueous mixture comprising water, a substituted hydrocarbon and a 1-oxa-4-azacyclohexane derivative; (b) reacting the aqueous mixture; (c) obtaining a solution comprising an organo-1-oxa-4-azoniumcyclohexane compound; (d) forming a molecular sieve reaction mixture comprising reactive sources of the elements in the framework and the solution; and (e) heating the reaction mixture to form the molecular sieve.

The 1-oxa-4-azonium cyclohexane salts are prepared from a substituted hydrocarbon and a 1-oxa-4-azacyclohexane derivative. Suitable substituted hydrocarbons include α,ω-dihalogen substituted alkanes having between 3 and 6 carbon atoms, and di-halogen substituted alkanes having between 3 and 8 carbon atoms.

α,ω-dihalogen substituted alkanes having between 3 and 6 carbon atoms include, but are not limited to, 1,3-dichloropropane, 1,4-dichlorobutane, 1,5-dichloropentane, 1,6-dichlorohexane, 1,3-dibromopropane, 1,4-dibromobutane, 1,4-dibromo-2-methylbutane, 1,5-dibromopentane, 1,6-dibromohexane, 1,3-diiodopropane, 1,4-diiodobutane, 1,5-diiodopentane, 1,6-diiodohexane and combinations thereof.

Di-halogen substituted alkanes having between 3 and 8 carbon atoms suitably include, but are not limited to, 1,2-dibromopropane, 1,3-dibromobutane, 1,3-dibromopentane, 1,4-dibromopentane, 2,4-dibromopentane, 1,5-dibromohexane, 1,4-dibromohexane, 1,3-dibromohexane, 2,4-dibromohexane, 2,5-dibromohexane, 2,5-dibromo-3-methylhexane, 2,5-dibromo-3,3-dimethylhexane, 1,4-dibromo-2-ethylbutane, and 1,2-dibromo-2-phenylethane. Halogen substitutions may be chlorine, bromine or iodine, but are illustrated for bromine. In an aspect, the two halogen substitutions may be the same or different.

Halogen substitutions may be chlorine, bromine or iodine, but are illustrated for bromine. In an aspect, the identity of the three halogen substitutions on the substituted hydrocarbon may be all different, all the same, or any combination thereof.

In an aspect, the mole ratio of the 1-oxa-4-azacyclohexane derivative to the substitution is from 1:1 to 2:1 and is preferably from 1:1 to 1.5:1. Typically, the mole ratio of 1-oxa-4-azacyclohexane derivative to substitution is approximately 1. Thus, when butylbromide is used as the substituted hydrocarbon, approximately 1 equivalent of 1-oxa-4-azacyclohexane derivative is typically used, whereas when 1,4-dibromobutane is used as the substituted hydrocarbon, approximately 2 equivalents of 1-oxa-4-azacyclohexane derivative are typically used. The 1-oxa-4-azacyclohexane derivative is illustrated in FIG. 1 and has the structure of formula 2:

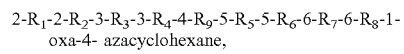
2-$R_1$-2-$R_2$-3-$R_3$-3-$R_4$-4-$R_9$-5-$R_5$-5-$R_6$-6-$R_7$-6-$R_8$-1-oxa-4- azacyclohexane, wherein $R_1$-$R_9$ are independently selected from H or an alkyl group having the formula $C_nH_{2n+1}$, and the total number of C atoms in the molecule is in the range of 4 to 12.

In some versions, $R_1$-$R_9$ are H.

In some versions, at least one of $R_1$-$R_9$ is an alkyl group. In some versions, at least two of $R_1$-$R_9$ are alkyl groups. In some versions, when at least two of $R_1$-$R_9$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

Suitable 1-oxa-4-azacyclohexane derivatives include, but are not limited to, 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof. Butyl may indicate n-butyl, sec-butyl, isobutyl or tert-butyl. Propyl may indicate n-propyl or isopropyl.

The process produces novel morpholinium compounds comprising 1-oxa-4-azonium cyclohexane salts. In one version, the 1-oxa-4-azonium cyclohexane salts have the structure of Formula 3:

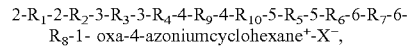
2-$R_1$-2-$R_2$-3-$R_3$-3-$R_4$-4-$R_9$-4-$R_{10}$-5-$R_5$-5-$R_6$-6-$R_7$-6-$R_8$-1- oxa-4-azoniumcyclohexane$^+$-X$^-$, wherein $R_1$-$R_8$ are independently selected from H or an alkyl group having the formula $C_nH_{2n+1}$ where n is in the range from 1 to 4; $R_9$ and $R_{10}$ form a cyclic alkyl group having the formula $C_mH_{2m}$ forming a heterocycle of ring size q, where m is in the range from 4 to 8, and q is in the range of 5 to m+1; X is a halide or hydroxide; and the total number of C atoms in the molecule is in a range of 8 to 17.

Another version of the 1-oxa-4-azonium cyclohexane salts have the structure of Formula 1:

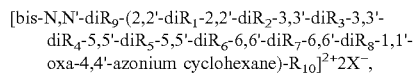

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m.

When the substituted hydrocarbon is an α,ω-dihalogen substituted alkane having between 3 and 6 carbon atoms, or a di-halogen substituted alkanes having between 3 and 8 carbon atoms, the 1-oxa-4-azonium cyclohexane salts may have the structure of either Formula 1 or Formula 3. When $R_9$ is an alkyl group, the structure of Formula 1 may be obtained. When $R_9$ is H, the structure of Formula 3 may be obtained.

The 1-oxa-4-azacyclohexane derivative includes $R_1$-$R_9$, and at least $R_{10}$ is from the substituted hydrocarbon. In some versions, the substituents at $R_1$-$R_8$ of the 1-oxa-4-azacyclohexane derivative and the substituents at $R_1$-$R_8$ of the 1-oxa-4-azoniumcyclohexane salt are the same. In some versions, the substituents at $R_1$-$R_9$ of the 1-oxa-4-azacyclohexane derivative and the substituents at $R_1$-$R_9$ of the 1-oxa-4-azoniumcyclohexane salt are the same.

One class of 1-oxa-4-azoniumcyclohexane salts have the structure of Formula 3:

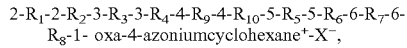

wherein $R_1$-$R_8$ are independently selected from H or an alkyl group having the formula $C_nH_{2n+1}$ where n is in the range from 1 to 4; $R_9$ and $R_{10}$ form a cyclic alkyl group having the formula $C_mH_{2m}$ forming a heterocycle of ring size q, where m is in the range from 4 to 8, and q is in the range of 5 to m+1; X is a halide or hydroxide; and the total number of C atoms in the molecule is in a range of 8 to 17.

In some versions, when $R_1$-$R_8$ are H, and m is 4, X is hydroxide. In some versions, when $R_1$-$R_8$ are H, m is in the range from 5 to 8.

In some versions, X is hydroxide.

The cyclic alkyl group can have from 4 to 8 carbons, and the heterocycle ring has a ring size of 5 to m+1. Most commonly, the heterocycle ring has 5 or 6 members. In some versions, q is 5. In some versions q is 6. In some versions, q is 5 or 6.

In some versions, $R_{10}$ can be a straight chain alkyl group or a branched alkyl group. When $R_{10}$ is a branched alkyl group, the heterocycle ring can have one or more alkyl substituents. For example, the use of 1,4-dibromo-4,4-dimethylbutane would yield a 5 member heterocycle ring with 2 methyl groups on the carbon adjacent to the nitrogen atom and the cyclic alkyl group has the formula $C_6H_{12}$.

In some versions, $R_1$-$R_8$ are H.

In some versions, at least one of $R_1$-$R_8$ is an alkyl group. In some versions, at least two of $R_1$-$R_8$ are alkyl groups. In some versions, when at least two of $R_1$-$R_8$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

In one version, the cyclic alkyl group has 5 carbons, q is 6, $R_1$-$R_8$ are H, and X is a halide.

Figure 4A:
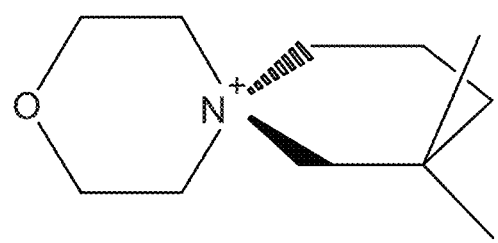
FIGS. 4A-B are illustrations of two types of quaternary ammonium compounds formed from 1-oxa-4-azacyclohexane derivatives.

As an example, FIG. 4A shows the 3-oxa-6-azonia-8,8-dimethylspiro[5.5]undecane product formed from the reaction of 1,5-dibromo-2,2-dimethylpentane with morpholine.

Another class of 1-oxa-4-azonium cyclohexane salts have the structure of Formula 1:

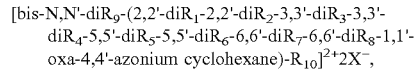

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m.

In some versions, when $R_1$-$R_8$ are H, $R_9$ is $CH_3$, $R_{10}$ is $C_4H_8$, x is 1, and y is 4, X is hydroxide; or when $R_1$-$R_8$ are H, $R_9$ is $CH_3$, $R_{10}$ is $C_5H_{10}$, x is 1, and y is 5, X is hydroxide; or when $R_1$-$R_8$ are H, $R_9$ is $CH_3$, $R_{10}$ is $C_6H_{12}$, x is 1, and y is 6, X is hydroxide; or when $R_1$-$R_8$ are H, $R_9$ is $CH_3$, $R_{10}$ is $C_7H_{14}$, x is 1, and y is 7, X is hydroxide; or when $R_1$-$R_8$ are H, $R_9$ is $C_2H_5$, $R_{10}$ is $C_6H_{12}$, x is 1, and y is 6, X is hydroxide.

In some versions, when $R_1$-$R_8$ are H and $R_9$ is $CH_3$ or $C_2H_5$, then X is hydroxide. In some versions, when $R_1$-$R_8$ are H and $R_9$ is $CH_3$, then m is 3 or 8. In some versions, when $R_1$-$R_8$ are H and $R_9$ is $C_2H_5$, then m is 3, 4, 5, 7, or 8. In some versions, when $R_1$-$R_8$ are H and $R_9$ is $CH_3$, then y is not equal to m. In some versions, when $R_1$-$R_8$ are H and $R_9$ is $C_2H_5$, then y is not equal to m. In some versions, when $R_1$-$R_8$ are H and $R_9$ is an alkyl group, then y is not equal to m.

In some versions, when $R_9$ is $CH_3$ or $C_2H_5$, then X is hydroxide. In some versions, when $R_9$ is $CH_3$, then m is 3 or 8. In some versions, when $R_9$ is $C_2H_5$, then m is 3, 4, 5, 7, or 8. In some versions, when $R_9$ is $CH_3$, then y is not equal to m. In some versions, when $R_9$ is $C_2H_5$, then y is not equal to m. In some versions, when $R_9$ is an alkyl group, then y is not equal to m.

In some versions, X is hydroxide.

In some versions, $R_{10}$ is a straight chain alkyl group (i.e., x is 1 and y is m).

In some versions, when $R_9$ is an alkyl group, X is hydroxide.

In some versions, $R_9$ is a methyl group. In some versions, $R_9$ is a methyl group and $R_{10}$ has 4 carbons. In some versions, $R_9$ is a methyl group, $R_{10}$ has 4 carbons, and $R_{10}$ is attached at the end of the chain to the two morpholine rings (i.e., x is 1, and y is 4). In some versions, the compound is a dihalide or a dihydroxide of 1,4-bis(4-methylmorpholinium)butane.

In some versions, $R_1$-$R_8$ are H. In some versions, when $R_1$-$R_8$ are H, $R_9$ is an alkyl group. In some versions, when $R_1$-$R_8$ are H, $R_9$ is H. In some versions, when $R_1$-$R_8$ are H and $R_9$ is $CH_3$, y and m do not have the same value. In some versions, when $R_1$-$R_8$ are H and $R_9$ is $C_2H_5$, In is selected from the group consisting of 3, 4, 5, 7, and 8.

In some versions, at least one of $R_1$-$R_8$ is an alkyl group. In some versions when at least one of $R_1$-$R_8$ is an alkyl group, R$_9$ is an alkyl group. In some versions, when at least one of R$_1$-R$_8$ is an alkyl group, R$_9$ is H.

In some versions, at least two of R$_1$-R$_8$ are alkyl groups. In some versions, when at least two of R$_1$-R$_8$ are alkyl groups, two of the alkyl groups are on the same C atom (e.g., R$_1$ and R$_2$, or R$_3$ and R$_4$, or R$_5$ and R$_6$, or R$_7$ and R$_8$).

Where more than one of R$_1$-R$_9$ is an alkyl group, the alkyl groups can be the same group or they can be different. Most commonly, the alkyl groups are methyl or ethyl groups.

In some versions, the 1-oxa-4-azonium cyclohexane salt comprises at least one of the di-halides or di-hydroxides of bis-: 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof. Butyl may indicate n-butyl, sec-butyl, isobutyl or tert-butyl. Propyl may indicate n-propyl or isopropyl.

Figure 4B:
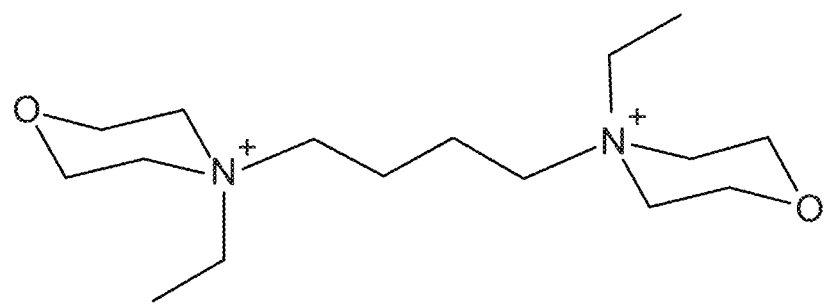

As an example, FIG. 4B shows the 1,4-bis(4-ethylmorpholinium) butane dibromide product formed from the reaction of 1,4-dibromobutane with 4-ethylmorpholine. The methods of the present invention may be carried out in preparation of microporous crystalline molecular sieves. In one aspect, the invention provides a method for synthesizing a molecular sieve, such as an aluminophosphate or a silicoaluminophosphate. The method may include the steps of: (a) preparing an aqueous mixture comprising water, a substituted hydrocarbon and a 1-oxa-4-azacyclohexane derivative; (b) reacting the aqueous mixture; (c) obtaining a solution comprising an organo-1-oxa-4-azoniumcyclohexane compound; (d) forming a reaction mixture comprising reactive sources of Al, Si, and P, and the solution; and (e) heating the reaction mixture to form the molecular sieve.

In one version of the process, an organic solvent is not used in obtaining the organo-1-oxa-4-azoniumcyclohexane compound structure directing agent.

In one version of the process, the organo-1-oxa-4-azoniumcyclohexane compound structure directing agents are prepared in the absence of P and Al reactive sources.

In one version of the method, the aqueous solution is essentially free of aluminum, silicon and phosphorous. In one version of the method, the aqueous solution is essentially free of aluminum and phosphorous. Essentially free of is meant to indicate that the element described was not intentionally added to the mixture or solution. Adventitious amounts of the element may be permitted, whether coming from dissolution of reactor walls, impurities in the starting materials or other causes. Essentially free of may signify that less than 1 wt % or less than 0.5 wt % or less than 0.1 wt % of the element is present.

The aqueous mixture is capable of forming an organo-1-oxa-4-azoniumcyclohexane halide salt such as a bromide salt, in order to ultimately provide a solution including a quaternary organoammonium compound.

The 1-oxa-4-azonium cyclohexane halide salt can be ion-exchanged, either by reaction with Ag$_2$O yielding AgX as a byproduct or by passage across anion exchange resins to yield the hydroxide form of the 1-oxa-4-azonium cyclohexane compound or used as the halide salt directly.

The ion-exchange process may involve contacting the 1-oxa-4-azonium cyclohexane halide salt with an ion-exchange resin having hydroxide ions. A particular ion-exchange resin capable of converting halide ions to hydroxide ions is Dowex Monosphere 550A UPW, available from Dow Chemical. The ion exchange may take place at temperatures from about 20° C. to about 85° C. or from about 20° C. to about 50° C. or from about 25° C. to about 40° C. for times from about 15 minutes to about 8 hours or from about 30 minutes to about 6 hours or from about 30 minutes to about 3 hours. The ion exchange may be performed in continuous or batch mode or any combination thereof. Batch mode is preferred when using Ag$_2$O and continuous mode is preferred when using ion exchange resin. Individual 1-oxa-4-azonium cyclohexane halide salts may require different operating conditions for the ion exchange from halide to hydroxide. Depending on the interaction of anion with the 1-oxa-4-azonium cyclohexane cation, ion-exchange may be difficult or impossible.

In molecular sieve synthesis, hydroxide is typically used as a mineralizing agent, so hydroxide SDA salts are often preferred to halide SDA salts.

In another version of the method, step (d) comprises forming a first mixture of the reactive sources of Me, Al, Si, P and the optional seeds of a molecular sieve, and adding the solution to the first mixture without cooling the first mixture.

In another version of the method, step (d) comprises forming a first mixture of the reactive sources of Me, Al, P and the optional seeds of a molecular sieve, and adding the solution to the first mixture without cooling the first mixture.

The step of forming an aluminophosphate reaction mixture comprises forming a reaction mixture of a composition expressed in terms of mole ratios of the oxides of:

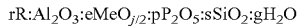

rR:Al$_2$O$_3$:eMeO$_{j/2}$:pP$_2$O$_5$:sSiO$_2$:gH$_2$O where, "r" has a value from about 0.01 to about 10, "e" has a value of 0 to about 1.0, "j" has a value from 2 to 4, "p" has a value of about 0.5 to about 8.0, "s" has a value of 0 to about 1.0, and "g" has a value of about 5 to about 4000. Additionally, the reaction mixture may comprise from about 1 to about 10 wt.-% of seed aluminophosphate based on the total mass of oxides in the reaction mixture, e.g., if there are 100 g of oxides in the reaction mixture, from about 1 to about 10 g of seed aluminophosphate would be added to the reaction mixture. In an aspect, the reaction mixture may additionally comprise another organoammonium or amine structure directing agent. R represents the organo-1-oxa-4-azoniumcyclohexane compound. Me represents an element selected from the main group elements Mg, Zn, Be, Ga, or from the first, second or third transition series. Non-limiting examples of this element include Ti, Fe, Co, Mg, Mn, Cu, Ni and Zn.

For the synthesis of coherently grown composite aluminophosphates and silicoaluminophosphates, r advantageously has a value from 1.5 to 8, and most advantageously has a value from 2 to 6; p advantageously has a value from 1.2 to 6.0, and most advantageously has a value from 1.5 from 4.0; g advantageously has a value from 80 to 500, and most advantageously has a value from 100 to 300.

Sources of aluminum include, but are not limited to, aluminum alkoxides, precipitated aluminas, aluminum metal, aluminum hydroxide, aluminum salts and alumina sols. Specific examples of aluminum alkoxides include, but are not limited to, aluminum sec-butoxide and aluminum isopropoxide. Sources of silica include, but are not limited to, tetraethylorthosilicate, colloidal silica, and precipitated silica. Source of phosphorous include, but are not limited to, orthophosphoric acid and phosphorous oxides.

The examples demonstrate a specific order of addition leading to the reaction mixtures from which the OSDAs described herein are formed. However, as there are a number of starting materials, many orders of addition are possible.

The 1-oxa-4-azonium cyclohexane salts having the structure of Formula 1 are of most interest in preparing the coherently grown composite of the present invention. In some versions, the 1-oxa-4-azonium cyclohexane salt comprises the reaction product of a substituted hydrocarbon and a 1-oxa-4-azacyclohexane derivative. In some versions, the substituted hydrocarbon is an $\alpha,\omega$-dihalogen substituted alkane having between 3 and 6 carbon atoms. In some versions, the 1-oxa-4-azacyclohexane derivative comprises 4-butylmorpholine, 4-propylmorpholine, 4-ethylmorpholine, 4-methylmorpholine.

The molecular sieves prepared from the OSDAs of the process of this invention can be used as a catalyst or catalyst support in various hydrocarbon conversion processes. Hydrocarbon conversion processes are well known in the art and include cracking, hydrocracking, alkylation of aromatics or isoparaffins, isomerization of paraffin, olefins, or poly-alkylbenzene such as xylene, trans-alkylation of poly-alkybenzene with benzene or mono-alkybenzene, disproportionation of mono-alkylbenzene, polymerization, reforming, hydrogenation, dehydrogenation, transalkylation, dealkylation, hydration, dehydration, hydrotreating, hydrodenitrogenation, hydrodesulfurization, methanation and syngas shift process.

EXAMPLES

In order to more fully illustrate the invention, the following examples are set forth. It is to be understood that the examples are only by way of illustration and are not intended as a limitation on the broad scope of the invention as set forth in the appended claims.

Comparative Example 1

413 g water was weighed into a 2 L Teflon bottle. 474.1 g. 1,5 Dibromopentane, 97% (2 moles) was added. To this mixture, 176 g. Morpholine, 99% (4 moles) was added while stirring. The water and morpholine combined to form a cloudy phase while the denser dibromopentane remained on the bottom. The Teflon bottle was moved into a 4 liter beaker as secondary containment and placed under a high speed overhead stirrer for stirring at room temperature. Approximately 1-1.5 liters of cool water were added to the 4 liter beaker to disperse a strong exotherm should one occur. At about 15 minutes, the mixture began to turn yellow, indicating the reaction was beginning. The exotherm was mild. After an hour, the result was a clear light orange "solution". The remaining 413 g water was mixed in to make the final solution. $^{13}C$ nuclear magnetic resonance (NMR) was used to confirm that the product comprises a 3-oxa-6-azoniaspiro [5.5]undecane bromide solution. Peaks for the spirocyclic compound were observed at 63.6, 59.9, 58.0, 21.0, and 18.9 ppm with respect to tetramethylsilane. Resonances for morpholinium were present at 59.9 and 43.4 ppm. The ratio of spirocyclic compound to morpholinium was 1:1. Variable temperature NMR, with C—N splitting is required to identify both compounds and acquire the proper integration ratios. The starting material 1,5-dibromopentane has peaks at 29.3, 34.4, and 36.2 ppm with integral ratios of 1:2:2 respectively which is not observed in the final solution.

Comparative Example 2

1150 grams of the solution from Example 1 was contacted with 336.4 grams of $Ag_2O$ in a round-bottom flask, which combined to form a grey opaque solution. The flask was placed under a high speed overheard stirrer for stirring at room temperature (open system) for 1 day. The sample was filtered to remove the precipitated silver bromide and the final solution was sent for water analysis which showed that the sample was composed of 64.6% water. $^{13}C$ nuclear magnetic resonance (NMR) was used to confirm that the product comprises a 3-oxa-6-azoniaspiro[5.5]undecane hydroxide solution. Peaks for the spirocyclic compound were observed at 67.1, 60.0, 57.9, 20.9, and 18.7 ppm with respect to tetramethylsilane. Resonances for morpholinium were present at 59.8 and 44.7 ppm. The ratio of spirocyclic compound to morpholinium was about 1:1. Comparing the $^{13}C$ chemical shifts for the bromide and hydroxide salts in Example 1 and Example 2 shows that the interaction of the 1-oxa-4-azonium cyclohexane salt with the anion varies with the identity of the anion. In particular, without wishing to be bound to theory, the chemical potential of the C atom next to the cationic N center is particularly affected. The electron density of the salt can be greatly affected by the identity of the anion.

Example 3

422.44 g water was weighed into a 2 L Teflon bottle, and the bottle was placed in a 4 L beaker. Under constant stirring, 218.1 g 1,4 dibromobutane, 99% was added to the water. To this mixture, 204.34 g 4-Methylmorpholine, 99% was added. Approximately 1.5 L tap water was placed in the 4 L beaker surrounding the Teflon bottle to help control the heat of reaction. Low heat, approximately 50° C., was used to warm up the mixture. Stirring was continued until a yellow solution was formed and no clear additional phase was present. $^{13}C$ NMR of the solution showed a ratio of 1 mole methylmorpholine to 2.83 moles 1,4-bis(4-methylmorpholinium)butane dibromide.

Example 4

88.65 g water was weighed into a 1 L Teflon bottle. 141.33 g 1,4-Dibromobutane, 99% was added. To this mixture, 154 g 4-Ethylmorpholine, 97% was added. The water and ethylmorpholine combined to form a cloudy phase while the denser dibromobutane remained on the bottom. The Teflon bottle was moved into a 2 liter beaker as secondary containment and placed under a high speed overhead stirrer for stirring at room temperature. The Teflon bottle was sealed and placed at 100° C. overnight with no stirring. After the solution was cooled back down to room temperature, 88 g of deionized water was added to the solution. The solution was again placed at 100° C. overnight with no stirring, and the result was a brown translucent solution which, by $^{13}C$ NMR contained peaks for 1,4-bis(4-ethylmorpholinium) butane dication. The sample was sent for water analysis which showed that it was composed of 36.6% water.

Example 5

196.5 g water was weighed into a 2 L Teflon bottle. 254.14 g 1,6-Dibromohexane, 96% was added. To this mixture, 204.34 g 4-Methylmorpholine, 99% was added. The water and morpholine combined to form a cloudy phase while the denser dibromohexane remained on the bottom. The solution was put in a 4 liter beaker as secondary containment and placed under a high speed overhead stirrer for stirring at room temperature. The solution was then transferred into a 2 L Parr autoclave, which was sealed and placed at 125° C. overnight with no stirring. 261.9 g deionized water was then added to obtain a 50% solution, and the sample was placed back into the 2 L Parr autoclave at 125° C. overnight. The result was a brown clear solution. $^{13}$C NMR showed peaks at 65.5, 60.6, 59.7, 47.0, 25.3, and 21.1 ppm in a 1:2:2:1:1:1 ratio for 1,6-bis(4-Methylmorpholinium)hexane dibromide and peaks at 64.9, 53.9, and 44.5 ppm in a 2:2:1 ratio for starting material 4-methylmorpholine. The ratio of diquaternary compound to amine was 1:0.9.

Example 6

1116 grams of the solution from Example 5 was contacted with 295.64 grams of $Ag_2O$ in a round-bottom flask, which combined to form a grey opaque solution. The flask was placed under a high speed overheard stirrer for stirring at room temperature for 1 day. The sample was filtered to remove the precipitated silver bromide, and the final solution was sent for water analysis which showed that the sample was composed of 60.9% water.

Comparative Example 7

36.36 g of the compound Bis-N-methylmorpholinium hexane dihydroxide (Example 6) was added into 10.67 g deionized water. The solution was placed under a high speed overhead stirrer for stirring. 10.90 g of orthophosphoric acid was added ($H_3PO_4$; Fisher Scientific, 85%), followed by 6.28 g of psuedoboehmite (Catapal B; Sasol 72.0%), and lastly followed by 2.00 g of colloidal silica (Ludox AS40, Sigma-Aldrich, 40%). The gel was mixed for 30 minutes, and then transferred to a Teflon-lined stainless steel autoclave.

Figure 6:
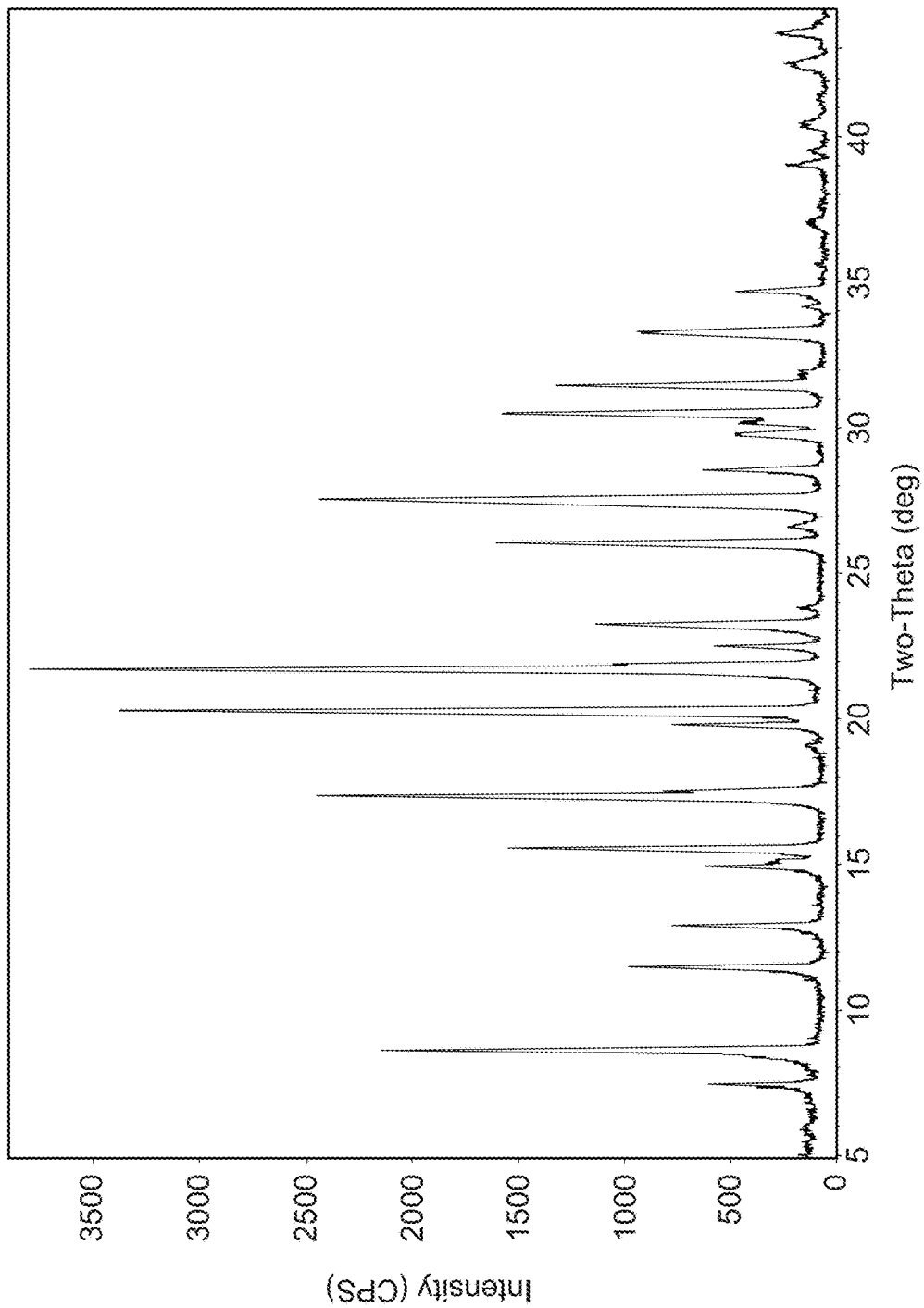
FIG. 6 shows the x-ray diffraction pattern of the Example 7 product.

The gel was heated and tumbled in an oven at 175° C. for 120 hours. After cooling the gel, the autoclave was opened, and the solids were isolated by centrifugation, washed with water, and dried at 100° C. overnight. The solids were characterized by x-ray diffraction, which were found to be SAPO-56 (AFX phase). The x-ray diffraction pattern of this material is shown in FIG. 6.

Example 8

46.24 g of the compound Bis-N-methylmorpholinium hexane dihydroxide (Example 6) was added into 22.61 g deionized water. The solution was placed under a high speed overhead stirrer for stirring. 3.38 g of aluminum hydroxide (Al(OH)$_3$; Pfaltz and Bauer, 72.3%) was added, followed by 0.71 g of colloidal silica (Ludox AS40, Sigma-Aldrich, 40%). The solution was mixed for 30 minutes, after which 8.67 g of orthophosphoric acid was added ($H_3PO_4$; Fisher Scientific, 85%). The solution was mixed for a further 30 minutes, and then transferred to a Teflon-lined stainless steel autoclave.

The gel was heated statically in an oven at 175° C. for 66 hours. After cooling the gel, the autoclave was opened, and the solids were isolated by centrifugation, washed with water, and dried at 100° C. overnight.

Figure 7B:
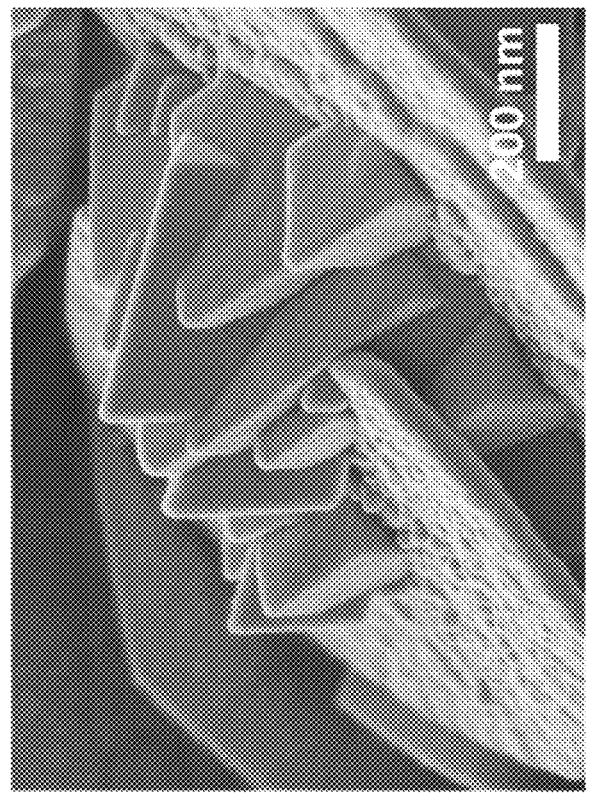
FIGS. 7A-B show the scanning electron micrographs of the Example 8 product showing the coherently grown composite.
Figure 7A:
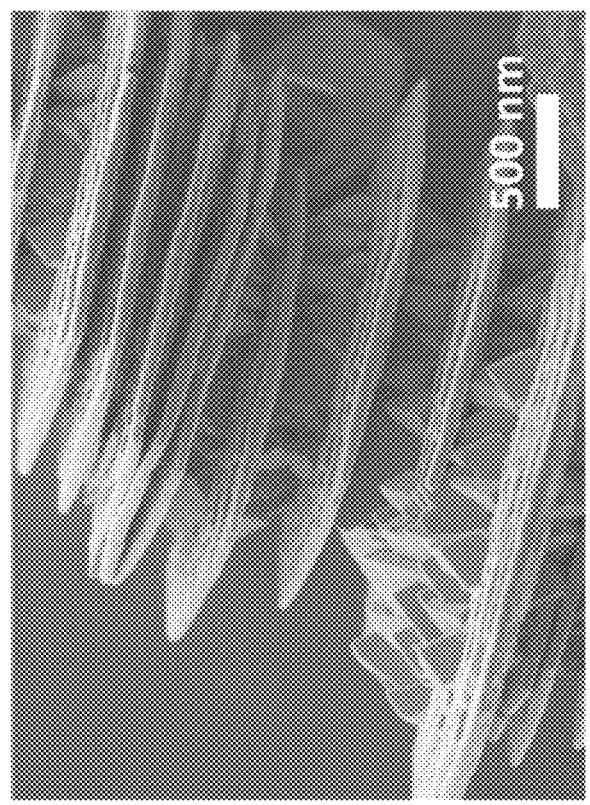
Figure 8B:
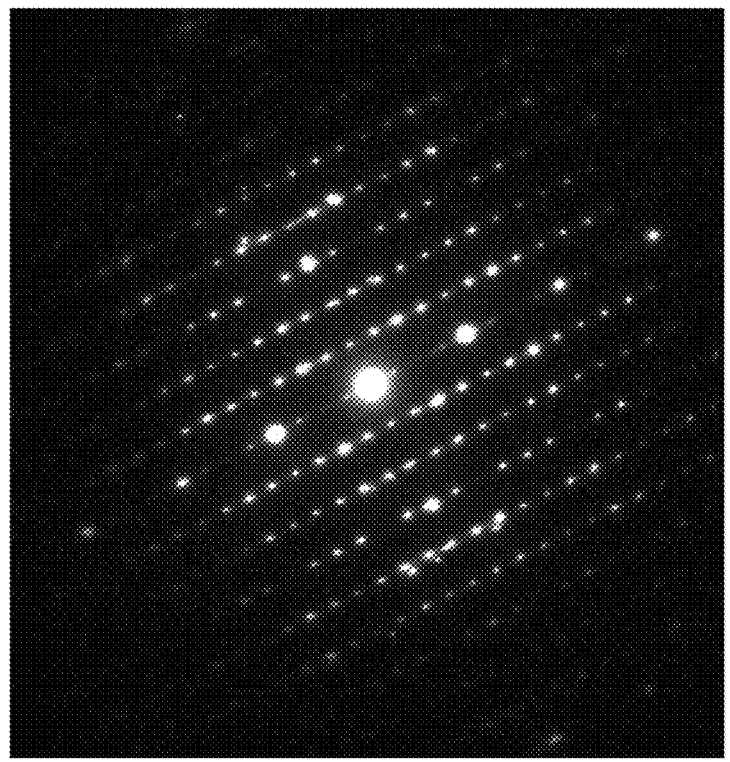
FIGS. 8A-B show the selected area electron diffraction pattern of the Example 8 product.
Figure 8A:
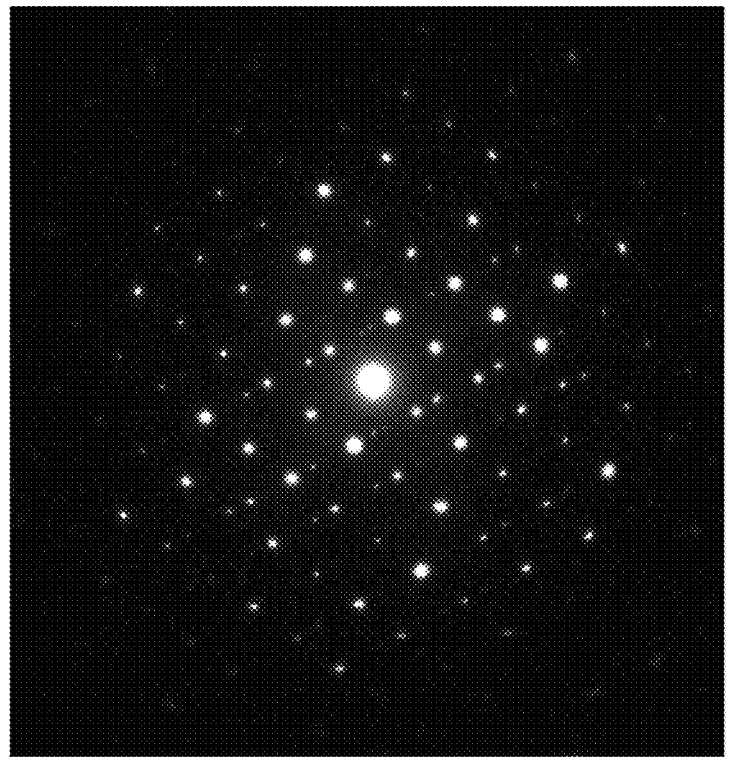

The solids (SAPO-71) were characterized by scanning electron microscopy (SEM) (FIGS. 7A-B), selected area electron diffraction (FIGS. 8A-B), and x-ray diffraction (FIG. 9), which revealed a coherently grown composite structure consisting of AFX and LEV phases. The SEM in FIGS. 7A-B shows the two distinct phases: the AFX phases are the hexagonal plates, while the protruding cubes are the LEV phase. FIG. 8A shows the selected area electron diffraction pattern for the LEV phase, while FIG. 8B shows the selected area electron diffraction pattern for the AFX phase. Both are [010] zone axis patterns, and the two patterns are to scale with one another. This illustrates the intimate and coherent relationship between the two phases and is evidence of a coherently grown composite structure. The SAPO-71 was calcined in air at 600° C. for four hours to remove the occluded organic template. Elemental analysis of the volatile-free SAPO-71 yielded an empirical formula of $Si_{0.132}Al_{0.465}P_{0.403}O_2$.

Example 9

50.17 g of the compound Bis-N-methylmorpholinium hexane dihydroxide (Example 6) was added into 17.38 g deionized water. The solution was placed under a high speed overhead stirrer for stirring. 3.28 g of aluminum hydroxide (Al(OH)$_3$; Pfaltz and Bauer, 72.8%) was added, followed by 0.51 g of colloidal silica (Ludox AS40, Sigma-Aldrich, 40%). The solution was mixed for 30 minutes, after which 8.47 g of orthophosphoric acid was added ($H_3PO_4$; Fisher Scientific, 85%). The solution was mixed for a further 30 minutes, and then transferred to a Teflon-lined stainless steel autoclave.

The gel was heated statically in an oven at 185° C. for 113 hours. After cooling the gel, the autoclave was opened, and the solids were isolated by centrifugation, washed with water, and dried at 100° C. overnight. The solids (SAPO-72) were characterized by x-ray diffraction (FIG. 10) and scanning electron microscopy, which revealed a coherently grown composite structure consisting of CHA and LEV phases. The SAPO-72 was calcined in air at 700° C. for three hours to remove the occluded organic template. Elemental analysis of the volatile-free SAPO-72 yielded an empirical formula of $Si_{0.060}Al_{0.519}P_{0.421}O_2$.

Example 10

100.34 g of the compound Bis-N-methylmorpholinium hexane dihydroxide (Example 6) was added into 34.95 g deionized water. The solution was placed under a high speed overhead stirrer for stirring. 6.56 g of aluminum hydroxide (Al(OH)$_3$; Pfaltz and Bauer, 72.8%) was added, followed by 0.69 g of colloidal silica (Ludox AS40, Sigma-Aldrich, 40%). The solution was mixed for 30 minutes, after which 16.94 g of orthophosphoric acid was added ($H_3PO_4$; Fisher Scientific, 85%). The solution was mixed for a further 30 minutes, and then transferred to a stainless steel autoclave equipped with a stirring turbine.

The gel was heated with stirring at 185° C. for 84 hours. After cooling the gel, the autoclave was opened, and the solids were isolated by centrifugation, washed with water, and dried at 100° C. overnight. The solids (SAPO-73) were characterized by x-ray diffraction (FIG. 11) and scanning electron microscopy, which revealed a coherently grown composite structure consisting of CHA and AFX phases. The SAPO-73 was calcined in air at 650° C. for four hours to remove the occluded organic template. Elemental analysis of the volatile-free SAPO-73 yielded an empirical formula of $Si_{0.051}Al_{0.521}P_{0.428}O_2$.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A coherently grown composite of two zeotypes having a crystalline three-dimensional framework of at least $AlO_2$ and $PO_2$ tetrahedral units, the two zeotypes selected from the group consisting of AFX, LEV, CHA, and ERI.

2. The coherently grown composite of claim 1 having an empirical formula expressed in molar ratios of:

$$mR:(Si_xAl_yP_zO_2)$$

where R represents at least one organic template present inside the pores of the molecular sieve; m is the molar ratio of R to $(Si_xAl_yP_zO_2)$ and has a value of about 0 to 0.5; x is the mole fraction of silicon and has a value from about 0 to 0.6; y is the mole fraction of aluminum and has a value from about 0.01 to 0.6; z is the mole fraction of phosphorus and has a value from about 0.01 to 0.55; and x+y+z=1.

3. The coherently grown composite of claim 2 wherein the two zeotypes are AFX and LEV.

4. The coherently grown composite of claim 2 characterized by an x-ray diffraction pattern having at least the d-spacings and intensities set forth in Table 1:

TABLE 1

| 2-Theta | d(Å) | I/I$_0$ (%) |
|---|---|---|
| 7.51 | 11.77 | w |
| 8.70 | 10.16 | m |
| 10.98 | 8.05 | m-s |
| 11.55 | 7.66 | m |
| 13.01 | 6.80 | w-m |
| 13.42 | 6.59 | w-m |
| 15.65 | 5.66 | m |
| 15.97 | 5.55 | w |
| 17.40 | 5.09 | vs |
| 17.57 | 5.04 | s-vs |
| 20.37 | 4.36 | s |
| 20.99 | 4.23 | s-vs |
| 21.94 | 4.05 | vs |
| 23.30 | 3.81 | s |
| 24.98 | 3.56 | w |
| 26.11 | 3.41 | m |
| 27.00 | 3.30 | w-m |
| 27.54 | 3.24 | vs |
| 28.50 | 3.13 | s |
| 30.56 | 2.92 | m |
| 31.55 | 2.83 | m |
| 32.22 | 2.78 | m-s |
| 33.31 | 2.69 | m |
| 34.47 | 2.60 | w. |

5. The coherently grown composite of claim 2 wherein the two zeotypes are CHA and LEV.

6. The coherently grown composite of claim 2 characterized by an x-ray diffraction pattern having at least the d-spacings and intensities set forth in Table 2:

TABLE 2

| z2-Theta | d(Å) | I/I$_0$ (%) |
|---|---|---|
| 6.10-6.24 | 14.49-14.15 | s-m |
| 8.65 | 10.21 | w-m |
| 9.49 | 9.31 | m |
| 10.94 | 8.08 | m-s |
| 12.94 | 6.84 | w-m |
| 13.40 | 6.60 | m |
| 13.96 | 6.34 | w |
| 16.04 | 5.52 | m |
| 17.35 | 5.11 | s-vs |
| 17.74 | 5.00 | m-s |
| 20.37 | 4.36 | w-m |
| 20.66 | 4.30 | s |
| 20.92 | 4.24 | s |
| 21.98 | 4.04 | vs |
| 23.33 | 3.81 | m-s |
| 24.93 | 3.57 | m-s |
| 26.02 | 3.42 | m |
| 27.01 | 3.30 | m |
| 28.45 | 3.13 | s |
| 29.21 | 3.05 | w |
| 30.70 | 2.91 | m |
| 31.08 | 2.88 | w-m |
| 31.56 | 2.83 | w-m |
| 32.28 | 2.77 | m-s |
| 34.46 | 2.60 | m. |

7. The coherently grown composite of claim 2 wherein the two zeotypes are CHA and AFX.

8. The coherently grown composite of claim 2 characterized by an x-ray diffraction pattern having at least the d-spacings and intensities set forth in Table 3:

TABLE 3

| 2-Theta | d(Å) | I/I$_0$ (%) |
|---|---|---|
| 6.08-6.30 | 14.53-14.02 | m-s |
| 8.75 | 10.10 | w |
| 9.50 | 9.30 | m |
| 12.94 | 6.84 | w-m |
| 13.96-14.05 | 6.34-6.30 | w-m |
| 15.66 | 5.65 | w |
| 16.06-16.12 | 5.52-5.50 | s |
| 17.40-17.47 | 5.09-5.07 | m |
| 17.69-17.79 | 5.01-4.98 | s |
| 18.71 | 4.74 | w |
| 19.08 | 4.65 | w-m |
| 19.78 | 4.48 | w |
| 20.67 | 4.29 | vs |
| 21.81-22.04 | 4.07-4.03 | s |
| 22.51 | 3.95 | w |
| 23.14-23.22 | 3.84-3.83 | w |
| 23.37 | 3.80 | w |
| 24.89-25.00 | 3.58-3.56 | s |
| 26.05 | 3.42 | m-s |
| 27.74 | 3.21 | m |
| 30.73 | 2.91 | s-vs |
| 31.06-31.16 | 2.88-2.87 | m-s |
| 34.65 | 2.59 | w-m. |

9. The coherently grown composite of claim 2 wherein R comprises a 1-oxa-4-azonium cyclohexane salt having the structure of Formula 1:

[bis-N,N'-diR$_9$-(2,2'-diR$_1$-2,2'-diR$_2$-3,3'-diR$_3$-3,3'-diR$_8$-1,1'-oxa-4,4'-azonium cyclohexane)-R$_{10}$]$^{2+}$ 2X$^-$, wherein R$_1$-R$_9$ are independently selected from H or an alkyl group having the formula $C_nH_{2n+1}$, where n is in the range from 1 to 4, X is halide or hydroxide, the total number of C atoms in the molecule is in the range of 11 to 24, and R$_{10}$ is an alkyl group having the formula $C_mH_{2m}$, where m is in the range from 3 to 8 and is connected to the 4 and 4' N atoms at positions x and y of the alkyl chain where x and y are independently selected from 1 to m.

10. The coherently grown composite of claim 9 wherein the 1-oxa-4-azonium cyclohexane salt comprises the reaction product of a substituted hydrocarbon and a 1-oxa-4-azacyclohexane derivative, and wherein the substituted hydrocarbon is an α,ω-dihalogen substituted alkane having between 3 and 6 carbon atoms.

11. The coherently grown composite of claim 9 wherein the 1-oxa-4-azonium cyclohexane salt comprises the reaction product of a substituted hydrocarbon and a 1-oxa-4-azacyclohexane derivative, and wherein the 1-oxa-4-azacyclohexane derivative comprises 4-butylmorpholine, 4-propylmorpholine, 4-ethylmorpholine, 4-methylmorpholine.

12. The coherently grown composite of claim 1 wherein the composite comprises greater than 0 and less than 100 wt. % the first zeotype and less than 100 wt. % and greater than 0 wt. % of the second zeotype.

13. The coherently grown composite of claim 1 wherein the composite comprises greater than 5 and less than 95 wt. % the first zeotype and less than 95 wt. % and greater than 5 wt. % of the second zeotype.

14. The coherently grown composite of claim 1 wherein the composite comprises greater than 10 and less than 90 wt. % the first zeotype and less than 90 wt. % and greater than 10 wt. % of the second zeotype.

15. The coherently grown composite of claim 1 wherein the coherently grown composite comprises regions of the first zeotype and regions of the second zeotype that are coherently aligned so that an [010] zone axis of the first zeotype is parallel to an [010] zone axis of the second zeotype.

16. A method for synthesizing coherently grown composite of two zeotypes having a crystalline three-dimensional framework of at least $AlO_2$ and $PO_2$ tetrahedral units, the two zeotypes selected from the group consisting of AFX, LEV, CHA, and ERI, the method comprising:
(a) preparing an aqueous mixture comprising water, a substituted hydrocarbon, and a 1-oxa-4-azacyclohexane derivative;
(b) reacting the aqueous mixture;
(c) obtaining a solution comprising an organo-1-oxa-4-azoniumcyclohexane compound, wherein the organo-1-oxa-4-azoniumcyclohexane compound having the structure of Formula 1:

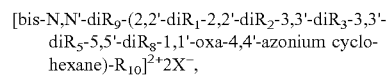

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m;
(d) forming a reaction mixture comprising reactive sources of Al, and P, and the solution; and
(e) heating the reaction mixture to form the molecular sieve.

* * * * *